US008957637B2

(12) United States Patent
Toth

(10) Patent No.: US 8,957,637 B2
(45) Date of Patent: Feb. 17, 2015

(54) SHUNT SYSTEM FOR CELLS IN A FUEL CELL STACK

(75) Inventor: Antoine Toth, Delemont (CH)

(73) Assignee: Belenos Clean Power Holding AG, Bienne (CH)

( * ) Notice: Subject to any disclaimer, the term of this patent is extended or adjusted under 35 U.S.C. 154(b) by 589 days.

(21) Appl. No.: 13/321,950

(22) PCT Filed: May 26, 2010

(86) PCT No.: PCT/EP2010/057260
§ 371 (c)(1),
(2), (4) Date: Feb. 15, 2012

(87) PCT Pub. No.: WO2010/136497
PCT Pub. Date: Dec. 2, 2010

(65) Prior Publication Data
US 2012/0162842 A1 Jun. 28, 2012

(30) Foreign Application Priority Data
May 27, 2009 (EP) .................................. 09161304

(51) Int. Cl.
H02J 7/00 (2006.01)
H01M 8/04 (2006.01)
(52) U.S. Cl.
CPC ........ H01M 8/0497 (2013.01); H01M 8/04223 (2013.01); H01M 8/04552 (2013.01); H01M 8/04671 (2013.01); H01M 8/04238 (2013.01); H01M 8/04582 (2013.01); Y02E 60/50 (2013.01)
USPC .......................................... 320/122; 320/116
(58) Field of Classification Search
USPC ................................. 320/122, 116
See application file for complete search history.

(56) References Cited

U.S. PATENT DOCUMENTS 6,150,795 A * 11/2000 Kutkut et al. ................. 320/118
6,441,583 B1 * 8/2002 Perelle .......................... 320/119
6,538,414 B1 * 3/2003 Tsuruga et al. ............... 320/119

(Continued)

FOREIGN PATENT DOCUMENTS

EP 1 638 159 3/2006
EP 2 107 632 10/2009

OTHER PUBLICATIONS

International Search Report Issued Aug. 20, 2010 in PCT/EP10/057260 Filed May 26, 2010.

Primary Examiner — M'Baye Diao
(74) Attorney, Agent, or Firm — Oblon, Spivak, McClelland, Maier & Neustadt, L.L.P.

(57) ABSTRACT

A shunt system for a stack of series connected electrochemical units. The system includes shunt circuits each connected between a positive pole and a negative pole of an electrochemical unit and a control circuit to send a control signal to at least one of the shunt circuits to cause it to shunt the electrochemical unit between the poles to which it is connected. The control system includes control modules each having its own voltage reference, each of the shunt circuits belonging to one of the modules. Each control circuit includes plural shunt circuits and the shunt circuits belonging to a control module are connected between the poles of contiguous electrochemical units, so that the control modules subdivide the stack into plural groups of electrochemical units. Each control module includes a mechanism to communicate with the control circuit, so that the control circuit can control the shunt circuits belonging to different control modules.

19 Claims, 3 Drawing Sheets

(56) References Cited

U.S. PATENT DOCUMENTS

| | | |
|---|---|---|
| 7,400,113 B2 * | 7/2008 | Osborne ................ 320/118 |
| 8,154,250 B2 * | 4/2012 | Yu et al. ................ 320/116 |
| 2004/0247964 A1 | 12/2004 | Sadamoto et al. |
| 2006/0057447 A1 | 3/2006 | Yamase et al. |
| 2007/0202371 A1 | 8/2007 | Takeda et al. |
| 2008/0309317 A1 * | 12/2008 | Chen et al. ................ 324/72 |
| 2009/0258282 A1 | 10/2009 | Harada et al. |
| 2009/0267566 A1 * | 10/2009 | Yano ................ 320/118 |
| 2010/0141209 A1 * | 6/2010 | Shiu et al. ................ 320/120 |

* cited by examiner

SHUNT SYSTEM FOR CELLS IN A FUEL CELL STACK

The present invention concerns a shunt system for a stack of series connected electrochemical units. The system includes shunt circuits each connected between a positive pole and a negative pole of an electrochemical unit. The system also includes a control circuit provided for sending a control signal to at least one of the shunt circuits to cause it to shunt the electrochemical unit between the poles to which it is connected.

BACKGROUND OF THE INVENTION

Assemblies of electrochemical units connected in series (often called stacks) are known. The electrochemical units thus assembled may be formed for example by accumulator elements, or by fuel cells. A fuel cell is an electrochemical device for converting chemical energy directly into electrical energy. For example, one type of fuel cell includes an anode and a cathode between which a proton exchange membrane is arranged, often called a polymer electrolyte membrane. This type of membrane only allows protons to pass between the anode and the cathode of the fuel cell. At the anode, diatomic hydrogen undergoes a reaction to produce $H^+$ ions which will pass through the polymer electrolyte membrane. The electrons generated by this reaction join the cathode by a circuit external to the fuel cell, thus generating an electric current.

Because a single fuel cell generally only produces a low voltage (around 1 Volt), fuel cells are often series-connected to form fuel cell stacks able to generate a higher voltage comprising the sum of the voltages of each cell. One drawback of fuel cell stacks is that disconnecting them is not sufficient to stop them. Indeed, if the current supplied at output by a fuel cell is suddenly reduced to zero, the fuel cells which form the stack are no longer able to eliminate the electrochemical energy they are producing, and the voltage across the terminals of the different cells is liable to rise to the point that it accelerates degradation of the polymer membrane and the catalysts associated therewith. It is not sufficient either to interrupt the supply of fuel and oxidant to stop a fuel cell stack. In this case, the quantity of fuel and oxidant enclosed within the stack is sufficient to maintain the reaction for a considerable period of time. In the case of a fuel cell stack that uses hydrogen as fuel and oxygen as oxidant, it may even take several hours for the stack to stop.

US Patent No. 2008/0038595 discloses a method for stopping fuel cell stacks. This prior art method starts upon reception of a stop control signal. The first step of the method consists in cutting off the oxygen supply. The second step of the method consists of producing a sustained current so as to use most of the oxygen present in the stack. The third step consists in introducing air into the oxygen conduits and, finally the last step consists in cutting off the hydrogen supply. Experience has shown that, during the operation of a fuel cell stack, the various cells do not all behave in exactly the same manner. In particular, they do not all deliver the same voltage and do not release the same quantity of heat either. Thus, during the second step of the above stop method, it is advantageous to individually adjust the currents produced from each cell of the stack.

Systems are already known for shunting the current passing through certain cells in a fuel cell stack. These systems are used for stopping a fuel cell stack or for isolating a defective cell.

A known system uses a network of diodes and valves as shown in FIG. 1. Each cell includes a diode and a gas supply valve. The diode and valve are electronically controlled by a calculation unit. When the calculation unit receives a stop control signal, it short-circuits the cells via the diode of each cell. At the same time, the calculation unit cuts off the gas supply valve or valves of the cell(s) concerned in order to stop the process.

Known systems for shunting the current passing through certain cells in a fuel cell stack have some drawbacks. In particular, certain fuel cell stacks include more than a hundred series-connected cells. However, depending upon the connected load and whether or not the state of a cell is good, the voltage from an individual cell may fluctuate between 0 and around 1.2 volts. Thus, in the case of a fuel cell stack, the potential difference between certain cells and earth may amount to several tens, or even hundreds of volts. Unfortunately, the ordinary semiconductor devices normally used for controlling the current shunt cannot withstand high voltages (higher than 12 or 18 volts) between their inputs and earth.

SUMMARY OF THE INVENTION

It is an object of the present invention to provide a shunt system wherein the semiconductor components used for controlling the current shunt are not subjected to excessive voltages.

The invention therefore concerns a shunt system for series-connected electrochemical units, wherein the system includes:
  shunt circuits, each connected between a positive pole and a negative pole of an electrochemical unit, and
  a control circuit arranged for sending a control signal to at least one of the shunt circuits to cause it to shunt the electrochemical unit between the poles to which it is connected.

The shunt system includes control modules each having its own voltage reference, each of the shunt circuits belongs to one of the modules, each control module includes several shunt circuits and the shunt circuits belonging to one control module are connected between the poles of the contiguous electrochemical units, so that the control modules subdivide the stack into several groups of electrochemical units, and each control module includes means for communicating with the control circuit, so that the control circuit can control the shunt circuits belonging to different control modules.

The system is characterized in that the shunt circuits are each associated with a voltage measuring means for measuring the potential difference between the poles of the electrochemical unit to which the shunt circuit is connected, in that each control module includes a calculation unit arranged for receiving signals from the control circuit, and in that said shunt means have a variable impedance which is controlled by said calculation unit according to the signals received from the control circuit, and the potential difference between the poles of the units with which said shunt means are respectively associated.

The division of the electrochemical units into several series each associated with a control module limits the potential difference between the units of the same series. Moreover, since each control module has its own voltage reference, the potential difference between the various units of the same series and the voltage reference of the control module associated with that series can be kept within a range compatible with ordinary semiconductor devices.

According to an advantageous variant of this invention, the shunt circuits of the system are each associated with a voltage measuring means for measuring the potential difference between the poles of the electrochemical unit to which the shunt circuit is connected. Moreover, each control module includes a processing unit arranged for receiving signals from the control circuit. Finally, said shunt circuits have a variable impedance which is controlled by said control unit according to the signals received from the control circuit, and the potential difference between the poles of the units with which the shunt circuits are respectively associated.

Since, according to this variant, the impedance of a given shunt circuit depends, in particular, upon the potential difference between the poles of the unit with which the shunt circuit is associated, this variant has the advantage of taking better account of the fact that, as seen hereinbefore, during operation of a fuel cell stack, the various cells do not all behave in exactly the same manner. Advantageous embodiments of the shunt system for series-connected electrochemical units of the present invention form the subject of the dependent claims 3 to 16.

One of the advantages of these embodiments is that they allow a stack of electrochemical units to be stopped gradually and safely. Indeed, by gradually decreasing the potential difference at the cell terminals owing to the variable impedance provided for each cell, the system according to this invention allows all of the gas contained in the cells to be used. This then prevents any gas residue in the cells which could damage the system.

BRIEF DESCRIPTION OF THE DRAWINGS

The objects, advantages and features of the system for controlling a stack of electrochemical units will appear more clearly in the following detailed description of at least one embodiment of the invention, given solely by way of non-limiting example and illustrated by the annexed drawings, in which.

DETAILED DESCRIPTION OF THE INVENTION

In the following description, all those parts of the fuel cell stack that are well known to those skilled in this technical field will be described only in a simplified manner.

Figure 1:
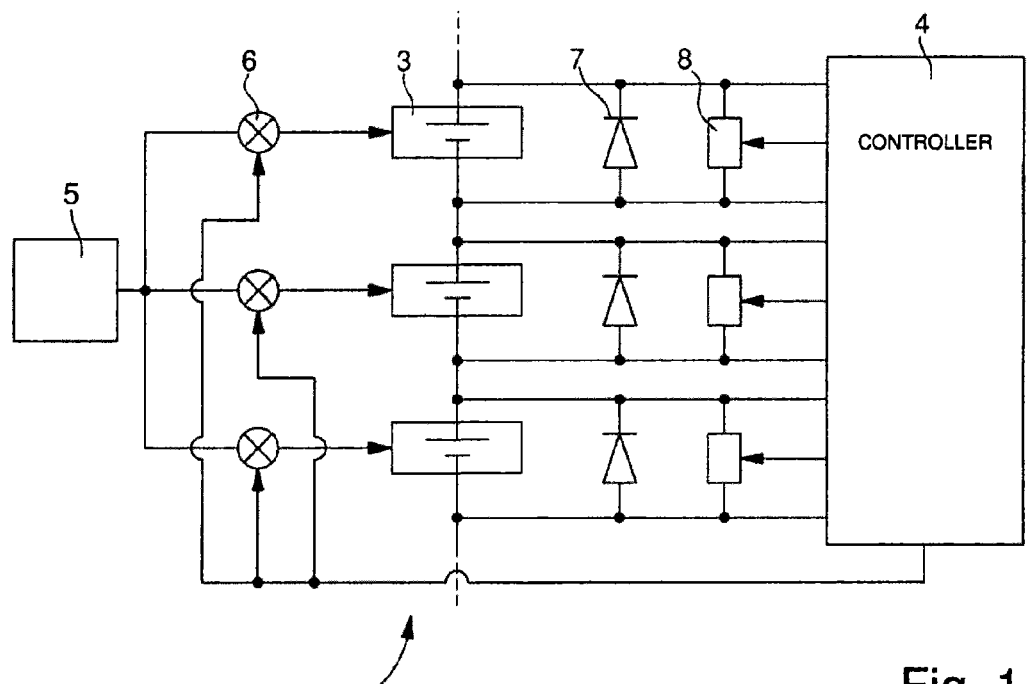
FIG. 1 shows schematically the cell shunt system according to the prior art.
Figure 2:
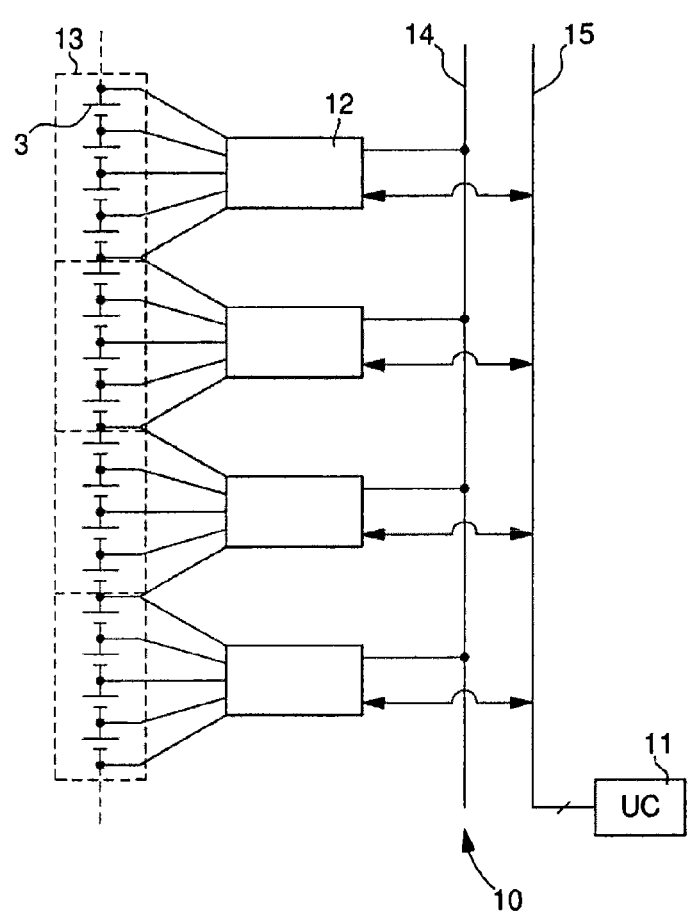
FIG. 2 is a schematic view of the control system for a stack of electrochemical units according to the present invention.

FIG. 2 shows a schematic view of a shunt system 10 according to the present invention, associated with a fuel cell stack. This stack includes a multitude of electrochemical units 3 each having a negative pole and a positive pole, used as connection points. In this example, each unit 3 may be formed of a single fuel cell or of several contiguous fuel cells. However, for the sake of simplicity, the following description will refer indiscriminately to units or cells, although is possible for one unit to be in fact formed of two or more cells. Units 3 are series-connected to form what is commonly called a fuel cell stack. Each cell supplies a voltage, the value of which reaches approximately 1.2 volts, which, for an example of around forty series-connected cells, gives a total voltage of around 48 volts.

Units 3 are grouped together to form groups or series 13 of several units. Each group 13 preferably includes the same number of units 3, and in this example each group has four units. Each group 13 of units 3 is coupled to a module 12. Each module 12 is arranged for communicating with a central control unit 11 which manages all of the modules via a communication bus 15. Each module 12 is powered by a power bus 14. This power bus 14 consists of a distinct power circuit, which is not dependent on the voltage supplied by the fuel cell stack. This enables modules 12 to operate even if the fuel cell stack is powered off.

Figure 3:
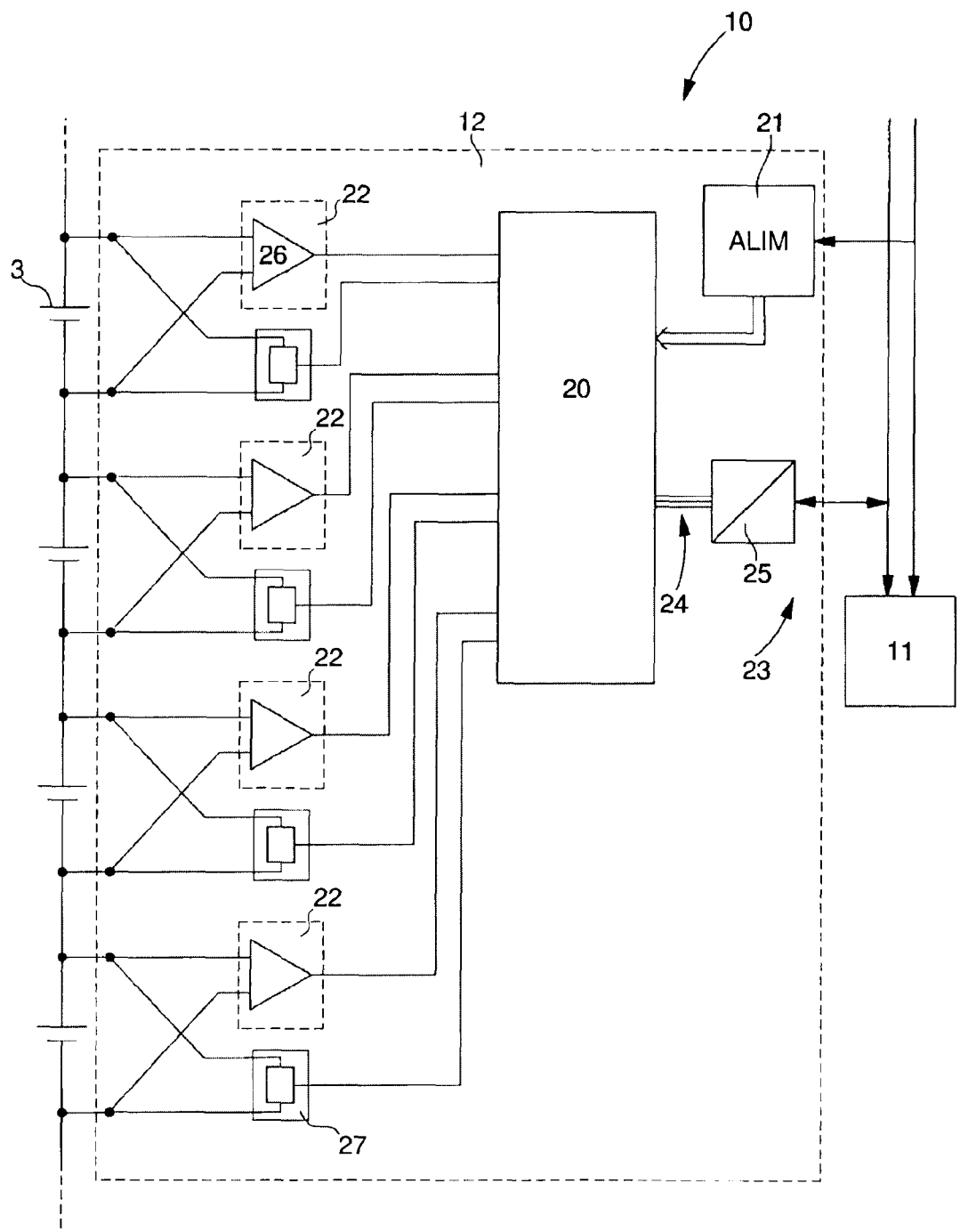
FIG. 3 shows a schematic view of a control module of the system according to the present invention.

FIG. 3 is a more detailed diagram of a module 12 forming part of a shunt system according to a particular embodiment of the present invention. Each control module 12 includes its own electric power supply 21, which receives its energy from power bus 15, but is galvanically separate therefrom. Owing to this feature, each module 12 can have its own reference voltage. In this example, galvanic isolation is ensured by an isolation transformer, the primary of which is connected to the power bus and the secondary of which forms part of power supply 21. In this example, power supply 21 supplies the elements of module 12 with a positive voltage of +2.5 volts and a negative voltage of −2.5 volts relative to the reference voltage of the module. Those skilled in the art will understand that instead of being inductively coupled to power bus 15, power supply 21 could alternatively be capacitively coupled to said power bus.

Each module 12 also includes a calculation unit 20, which in this example is implemented in the form of a micro-processor. This calculation unit 20 manages said module 12 and is in turn controlled by central control unit 11. Calculation unit 20 is powered by the power supply of module 12. It communicates with central control circuit 11 via a communication system 23. This communication system 23 allows the central control circuit 11 to send instructions to the calculation unit 20 of each module 12. It also enables each calculation unit to send central control unit 11 information as to the state of the cells associated with its module. In this example, communication system 23 includes a transfer bus 24 connected to communication bus 15 via optocouplers 25. The optocouplers uncouple module 12 galvanically from the rest of the system. The number of optocouplers 25 is thus a function of the communication protocol type, thus an SPI bus of the example disclosed includes 3 distinct wires. Each wire of the bus thus includes one optocoupler 25. Of course, the communication protocol is not limited to an SPI bus and the use of any other protocol, such as for example the $I^2C$ protocol, can be envisaged.

FIG. 3 shows that calculation unit 20 is connected to the four electrochemical units 3 of group 13 via four measuring circuits 22. In this example, measuring circuits 22 are each formed by a differential amplifier 26, associated with a unit 3, as shown in FIG. 3. These differential amplifiers 26 operate with voltages supplied by power supply 21. Amplifiers 26 have two inputs respectively connected to the positive pole and to the negative pole of the various units 3, as shown in FIG. 3. Differential amplifiers 26 are arranged to form subtracter circuits allowing each amplifier to measure the potential difference between the cathode and the anode of a unit 3. In this example, where each group 13 includes four units 3, there are thus four differential amplifiers 26, i.e. one per unit 3.

As already stated, according to the present invention, each module 12 is thus made independent by the fact that it has its own voltage reference. For this purpose, the earth of each module 12 is connected to one of the connection terminals of one of units 3 of the group 13 which is associated therewith. It will be clear that, owing to this feature, the potential difference between the inputs of a differential amplifier 26 and the earth thereof does not exceed a few volts.

Preferably, the connection point used as reference is taken in the middle of the series of units forming group 13. In this example, where the groups include four units, the reference voltage is thus taken between the second and third unit. It is also clear that the maximum number of units per module depends upon the maximum potential difference tolerated by a differential amplifier 26 between earth and one of the inputs thereof. Thus, in the case where the maximum tolerated potential difference is 8V, and where each unit 3 produces a maximum of 1.2V, the maximum number of units 3 is 12 (6×1.2V).=7.2V.; 7.2V.<8V.).

Differential amplifier 26 is arranged to supply at output a voltage representative of the potential difference between the poles of unit 3. Calculation unit 20 receives the voltages supplied by the four differential amplifiers 26 of module 12 across four distinct inputs. In this example, calculation unit 20 is digital and not analogue. In these conditions, the signals received at input by calculation unit 20 are first of all digitized, and the digitized voltage values of the various cells 3 are then sent to central control unit 11 via communication means 23.

The main advantage of having several amplifiers 26 per group 13 of units 3 is that the measurement is performed quickly. Indeed, it then becomes possible to digitize several potential differences at the same time. This digitization synchronization is improved if calculation unit 20 has a number of analogue/digital converters equal to the number of differential amplifiers 26. Given that the units 3 are divided into groups 13, each group 13 performs the potential difference measurements at the same time, i.e. in parallel. It is therefore possible for all of the potential difference measurements of units 3 to be extracted and digitized at the same time.

Conversely, if calculation unit 20 has only one analogue/digital converter, all of the potential differences are extracted at the same time, but the various measurements are converted into a digital value sequentially and not simultaneously. Calculation unit 20 alternately selects each potential difference from each differential amplifier 26 with a time difference of around 20 µs. Thus, the entire set of potential differences 26 of a group 13 of four units 3 is performed in approximately 80 µs. Nonetheless, the division of electrochemical units 3 into groups 13 limits these effects. This theoretically means that all of the potential difference measurements of all of units 3 can be performed in approximately 80 µs.

As already stated, once the potential difference values are converted into digital form, these values are sent to control unit 11. This data is sent in series via communication system 23 and communication bus 14, i.e. unit 3 by unit 3, one after the other. This data is then used by the control unit to manage fuel cell stack 10.

One of the aspects of managing a fuel cell stack is stopping the operation thereof. To achieve this, fuel cell stack 10 includes shunt circuits to turn off each unit 3 individually by lowering the potential difference at the terminals thereof. This potential difference is decreased to a value close to zero and kept at this value so as to turn off the unit without damaging it. These shunt circuits may also be employed in an emergency to isolate one unit 3 in fuel cell stack 10.

Figure 4:
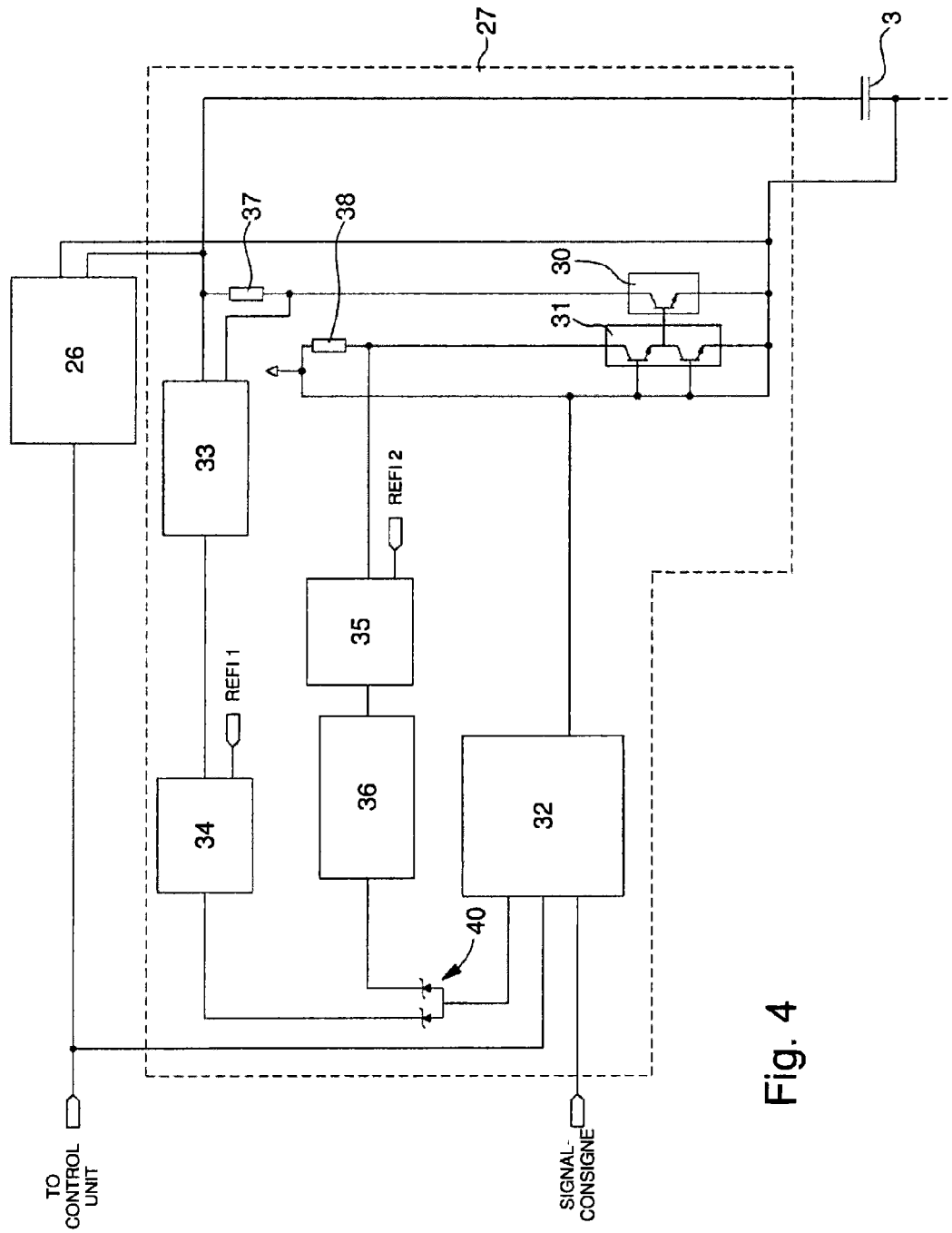
FIG. 4 shows schematically the shunt system according to the present invention.

These shunt circuits are referenced 27 in FIG. 3 and an example embodiment of the shunt circuits is schematically shown in FIG. 4. Referring now to FIG. 4, the shunt circuit shown includes first of all a bipolar shunt transistor NPN (or PNP according to polarisation) referenced 30, which is connected between the positive pole and the negative pole of cell 3 in series with a resistor 37. The base of bipolar shunt transistor 30 is connected to the connection point between a pair of driver transistors 31 which are series-connected and have different polarisation. FIG. 4 also shows that the pair of driver transistors 31 are in turn connected by their base to a control generator, formed by a adder element 32, which includes a first input arranged for receiving a reference signal from calculation unit 20 (FIG. 3). Adder element 32 has a second input which is connected to the output of amplifier 26 of voltage measuring circuit 22. Adder element 32 also has a third input connected both to the output of a comparator 3 and to the output of a inverter 36. The comparator circuit 34 includes a first input which is connected to the output of a differential amplifier 33 and a second input which is arranged for receiving a predefined reference voltage. Differential amplifier 33 has two inputs respectively connected to the terminals of resistor 37 in series with bipolar transistor 30. In addition to the input of comparator 34, the output of differential amplifier 33 is also connected to one input of calculation unit 20 (FIG. 3). The input of inverter 36 is connected to the output of a second comparator 35. Comparator 35 is connected via a first input to one of the terminals of a resistor 38 connected in series with the pair of driver transistors 31. The other input of comparator 35 is arranged for receiving a second predefined reference voltage.

The shunt circuit of this example operates on the active load principle. The voltage applied across the base of NPN transistor 30 varies the collector current. This current and voltage variation generates an impedance variation which is used in the present invention to control the quantity of current which passes into the shunt. NPN shunt transistor 30 is controlled by the assembly formed by the pair of transistors 31, powered by a voltage of +2.5 volts. These two transistors act as intermediary between the NPN transistor acting as active load and the control generator 32. As already stated, control generator 32 is a adder type differential amplifier circuit. This adder circuit performs the sum of three signals. One of these signals is the reference generated by calculation unit 20. This reference may be a pulse width modulation or linear signal.

The second incoming signal in adder circuit 32 is the potential difference measurement of the unit 3 to which the active load system 27 and differential amplifier 26 are connected. This use of the measured voltage regulates the turning off of the control system of a stack of electrochemical units 3.

The third incoming signal in adder circuit 32 is a security signal. Indeed, the use of an active load system for lowering the value of a potential difference causes a current variation. The current variation in a resistive element causes a variation in the Joule effect and thus in the heat produced.

Therefore, the shunt system includes a current limiter system acting on the reference signal supplied by the calculation unit to limit the current passing through the active load. This current limiter system includes two current monitoring modules. A first monitoring module is used for monitoring the shunt current and a second monitoring module is used for monitoring the current passing through the pair of serial driver transistors 31 driving the active load.

The first module includes resistor 37 series connected with NPN shunt transistor 30. This resistor is used in a current measuring circuit 33. Indeed, the current measuring circuit 33 uses an external resistor to measure the current in this resistor. This current value is then converted into a potential difference value representative of the current, which will be sent at output. This potential difference representative of the current is then sent to the differential amplifier comparator circuit 34 having an integrator function. The comparator circuit uses a predefined reference voltage which is the current not to be exceeded. If the current representative voltage is less than this reference voltage, the comparator circuit 34 does not conduct and, conversely, if the current representative voltage is higher than this reference voltage, comparator circuit 34 does conduct. In the event of conduction, circuit 34 which has an integrator function, performs its action. The integrator function is thus used to slow down the system, i.e. to prevent any excessive variations in the current representative signal used for correcting the reference signal from the calculation unit. The integrator function is used for smoothing the correction voltage and consequently the reference signal.

The second module is used for monitoring the current passing through the two serial driver transistors 31 driving the active load. This module includes a comparator circuit 35 with an integrator differential amplifier. This circuit includes a resistor 38 series connected with the two driver transistors 31 driving the NPN active load shunt transistor 30, between the 2.5 volt power supply and the collector of the first of the two driver transistors 31. The current representative voltage passing through resistor 38, series connected with the two driver transistors, and the second predefined reference voltage are connected to the inputs of differential amplifier 35. If the current representative voltage is less than the reference voltage, the comparator circuit does not conduct and conversely, if the current representative voltage is higher than this reference voltage, the comparator circuit does conduct. In the event of conduction, the resulting signal is then sent into a adder circuit 36 to allow the signal to be taken into account for driving the active load. This second module provides additional protection and is therefore not indispensable.

The outgoing signals from the first and second modules are then added and sent to adder element 32 to be used for regulation. Diodes 40, such as for example Schottky diodes, may advantageously be provided at the output of the first and second monitoring modules. These Schottky diodes 40 are connected in reverse and are used for preventing the output signal of each module from interfering with the other module. Thus, there is no voltage restoration through the two modules.

In a first variant, temperature sensors may be provided to increase the system protection. These temperature sensors may be located either on the board including the various components of the different circuits presented here or on the units. Indeed, the temperature measurement of units 3 or of each cell allows stop protocols to be set for fuel cell stack 10. The temperature sensors of each unit 3 may be connected to the calculation units associated with said units 3. Thus, since each control unit manages its own unit, it is simpler for each calculation unit 20 to extract the temperature data directly in order to act as quickly as possible. This reaction may be to stop the unit 3 in question or to stop the system generally.

It will be clear that various alterations and/or improvements and/or combinations evident to those skilled in the art may be made to the various embodiments of the invention set out above without departing from the scope of the invention defined by the annexed claims. For example, the shunt system according to the present invention may be applied to a battery system including a multitude of electrochemical cells.

The invention claimed is:

1. A shunt system for a stack of series-connected electrochemical units, the system comprising:
    shunt circuits, each connected between a positive pole and a negative pole of an electrochemical unit;
    a control circuit, arranged for sending a control signal to at least one of the shunt circuits to cause it to shunt the electrochemical unit between the poles to which it is connected; and
    control modules each having its own voltage reference, each of the shunt circuits belonging to one of the modules, each control module including plural shunt circuits and the shunt circuits belonging to one control module being connected between the poles of the contiguous electrochemical units, so that the control modules subdivide the stack into plural groups of electrochemical units, each control module including means for communicating with the control circuit, so that the control circuit can control the shunt circuits belonging to different control modules;
    wherein the shunt circuits are each associated with a voltage measuring means for measuring the potential difference between the poles of the electrochemical unit to which the shunt circuit is connected, wherein each control module includes a calculation unit arranged for receiving signals from the control circuit, and wherein the shunt circuits have a variable impedance which is controlled by the calculation unit according to the signals received from the control circuit, and the potential difference between the poles of the units with which the shunt circuits are respectively associated.

2. The system according to claim 1, wherein the shunt circuits include a first device for measuring the current intensity in the shunt so that the calculation unit takes account of the current intensity for controlling the impedance of the shunt circuit.

3. The system according to claim 1, wherein the shunt circuits include at least one shunt transistor connected between the terminals of each unit.

4. The system according to claim 2, wherein the shunt circuits include at least one shunt transistor connected between the terminals of each unit.

5. The system according to claim 3, wherein the at least one shunt transistor is driven by at least two driver transistors connected in series and controlled by the calculation unit.

6. The system according to claim 4, wherein the at least one shunt transistor is driven by at least two driver transistors connected in series and controlled by the calculation unit.

7. The system according to claim 5, wherein the current from the at least two driver transistors is monitored by a second device for measuring the current intensity so that the calculation unit takes account of the current intensity in the transistors to control the shunt circuit.

8. The system according to claim 6, wherein the current from the at least two driver transistors is monitored by a second device for measuring the current intensity so that the calculation unit takes account of the current intensity in the transistors to control the shunt circuit.

9. The system according to claim 1, wherein the measuring means are connected to the calculation unit so as to convert the extracted potential difference into a digital value.

10. The system according to claim 1, wherein the communication means includes galvanic isolation means.

11. The system according to claim 1, wherein the measuring means includes a plurality of differential amplifiers each arranged to be connected by two inputs to the terminals of an electrochemical unit to supply at an output a voltage representative of the potential difference present between the terminals of the electrochemical unit.

12. The system according to claim 11, wherein each differential amplifier measures the voltage difference between the terminals of two electrochemical cells.

13. The system according to claim 1, wherein each control module further includes a power system peculiar thereto, to enable the module to operate even if the system for controlling a stack of electrochemical units is not operating.

14. The system according to claim 11, wherein the differential amplifiers have a maximum input voltage and wherein in each group of electrochemical units, the addition of the potential differences between the various units does not exceed the maximum input voltage.

15. The system according to claim 1, wherein each group of electrochemical units includes four electrochemical units.

16. The system according to claim 15, wherein each electrochemical unit includes a fuel cell.

17. The system according to claim 15, wherein each electrochemical unit includes two fuel cells.

18. The system according to claim 1, wherein each group of electrochemical units includes eight electrochemical units.

19. The system according to claim 18, wherein each electrochemical unit includes a fuel cell.

* * * * *